(12) United States Patent
Henke

(10) Patent No.: US 6,804,911 B1
(45) Date of Patent: Oct. 19, 2004

(54) APPARATUS FOR HARVESTING BAIT

(76) Inventor: James Henke, P.O. Box 1032, St. Bernard, LA (US) 70806

( * ) Notice: Subject to any disclaimer, the term of this patent is extended or adjusted under 35 U.S.C. 154(b) by 0 days.

(21) Appl. No.: 10/116,771

(22) Filed: Apr. 4, 2002

(51) Int. Cl.$^7$ .............................................. A01K 69/00
(52) U.S. Cl. ...................................................... 43/100
(58) Field of Search ........................ 43/100, 102, 103, 43/104, 105

(56) References Cited

U.S. PATENT DOCUMENTS

| | | | |
|---|---|---|---|
| 748,201 A | 12/1903 | Miller | |
| 877,232 A | 5/1908 | Crowson | |
| 1,445,763 A | 2/1923 | Gibbs et al. | |
| 2,119,828 A | 6/1938 | Nordenstam | |
| 2,218,843 A | 10/1940 | Fuller, Jr. | |
| 2,490,180 A | 12/1949 | Varnedoe, Jr. | |
| 2,536,281 A | 1/1951 | Hamel | |
| 2,578,172 A | 12/1951 | Burton | |
| 3,099,890 A | 8/1963 | Madere | |
| 3,176,427 A | * 4/1965 | Hershey | 43/100 |
| 3,271,894 A | 9/1966 | Manno et al. | |
| 3,337,982 A | 8/1967 | Sajulan | |
| 3,497,989 A | * 3/1970 | Schultz | 43/100 |
| 3,678,612 A | 7/1972 | Hendrickson | |
| 3,699,702 A | * 10/1972 | Lankenau | 43/100 |
| 3,795,073 A | 3/1974 | Olsen | |
| 3,906,655 A | * 9/1975 | Lowenthal | 43/100 |
| 4,030,232 A | 6/1977 | Niva | |
| 4,107,867 A | 8/1978 | Kennedy | |
| 4,134,225 A | 1/1979 | Welch | |
| 4,184,283 A | 1/1980 | Wyman | |
| 4,262,379 A | * 4/1981 | Jankiewicz | 43/100 |
| 4,416,082 A | 11/1983 | Strobel | |
| 4,424,641 A | * 1/1984 | Kyte | 43/102 |
| 4,509,288 A | * 4/1985 | Shepherd | 43/102 |
| 4,604,823 A | 8/1986 | Ponzo | |
| 4,611,424 A | 9/1986 | Tarantino | |
| 4,819,369 A | * 4/1989 | Bodker | 43/102 |
| 4,843,756 A | 7/1989 | Wyman et al. | |
| 4,848,025 A | * 7/1989 | Wyman | 43/102 |
| 4,864,770 A | 9/1989 | Serio | |
| 4,905,405 A | 3/1990 | Hendricks | |
| 4,914,856 A | * 4/1990 | Kennedy | 43/100 |
| 5,119,584 A | 6/1992 | Rhodes | |
| 5,168,653 A | 12/1992 | Wyman et al. | |
| 5,259,809 A | 11/1993 | Rainey, Jr. | |
| 5,353,541 A | 10/1994 | Jonason et al. | |
| 5,357,708 A | 10/1994 | Peters et al. | |
| 5,632,114 A | 5/1997 | McKenzie | |
| 5,771,627 A | 6/1998 | Mattson et al. | |
| 5,839,220 A | 11/1998 | Wass | |

* cited by examiner

Primary Examiner—Kurt Rowan
(74) Attorney, Agent, or Firm—Garvey, Smith, Nehrbass & Doody, L.L.C.; Brett A. North

(57) ABSTRACT

A trap capable of harvesting bait fish in open water or in ponds. In one embodiment a wire mesh cage having capture gates using longitudinal bores and angled rods, each sized to admit desired bait fish but exclude predatory fish. A bait box is provided to hold bait to attract the desired fish. The mesh construction of the cage permits free flow of water currents and visibility of the bait in the bait box. The mesh can also be sized, to provide size selection, by permitting the ready escape of immature and smaller bait fish.

18 Claims, 3 Drawing Sheets

US 6,804,911 B1

APPARATUS FOR HARVESTING BAIT

CROSS-REFERENCE TO RELATED APPLICATIONS

Not applicable

STATEMENT REGARDING FEDERALLY SPONSORED RESEARCH OR DEVELOPMENT

Not applicable

REFERENCE TO A "MICROFICHE APPENDIX"

Not applicable

BACKGROUND

This invention pertains to traps for capturing bait and, more particularly, to a novel entrance gate for allowing entry of bait fish, such as minnows and killies into, and preventing egress of these fish from the trap. In recent years, in many regions of the world, the bait industry has faced declining harvests.

In the past, a great many devices have been proposed for capturing fish and other animals in a trap. Such devices are described in patents found in U.S. Patent Office Class 43 and subclasses 65, 66, 77, 81, 100, 102, 103, and 105. For example, U.S. Pat. No. 4,107,867 to Kennedy shows a catfish trap having two successive entry passages that are sized and arranged to capture fish of a predetermined size. U.S. Pat. No. 3,271,894 to Manno shows a "head" or entry passage for a shellfish trap in which the heads 25 are conical in shape with "closely spaced" pointed fingers 32 formed by splitting the conical shell of the head.

U.S. Pat. No. 3,337,982 to Sajulan shows a fish trap having a plurality of fish entry passages 10, the walls of which are formed by chicken wire that extends into the passages to provide rows of fingers or prongs 17 that the fish must pass through on its way into the trap. Bait box or container 18 is provided in a central region of the traps.

While certain novel features of this invention shown and described below are pointed out in the annexed claims, the invention is not intended to be limited to the details specified, since a person of ordinary skill in the relevant art will understand that various omissions, modifications, substitutions and changes in the forms and details of the device illustrated and in its operation may be made without departing in any way from the spirit of the present invention. No feature of the invention is critical or essential unless it is expressly stated as being "critical" or "essential."

SUMMARY

The apparatus of the present invention solves the problems confronted in the art in a simple and straightforward manner. What is provided is an apparatus for harvesting bait fish, such as minnows and killies. The present invention relates generally to sporting and fishing equipment and, more specifically, to unattended traps for the capture of bait fish, such as minnows and killies.

The invention includes a trap which may be deployed in the open water and/or ponds and has demonstrated the ability to rapidly and selectively capture large quantities of desired bait fish such as minnows and killies while largely eliminating the capture of underdeveloped/undesirably small fish. The trap has been tested in marine environments, and for free swimming minnows or killies, rapidly fills within several hours to maximum capture. The amount of undesirably small fish caught is negligible. The invention also provides a suitable capture mechanism for pond raised bait fish. The ability of the trap to harvest a desired size bait fish, and not damage smaller immature bait fish can be especially valuable in a pond environment.

It is an object of this invention to provide a trap which will: (1) allow bait fish to easily observe bait, and other fish pursuing the bait inside the trap and/or at least one entrance gate; (2) allow bait fish to enter the trap through the one or more gates with ease; (3) restrict fish within the trap from exiting through the one or more gates; (4) not injure or puncture the flesh of fish entering or attempting to leave the trap; (5) be of durable construction such that damage will not be sustained when the trap is loaded with fish and it is being hauled through and out of the water; and (6) be economical to manufacture and assemble.

It is a further object of the invention to disclose an apparatus which will harvest commercial quantities of bait fish without destruction of immature species.

It is a further object of the invention to disclose an apparatus that will harvest commercial quantities of bait fish that can be set in lines or used as a portable harvester.

It is a further object of the invention to provide a device allowing bait fish to freely enter the trap, but such fish are restricted by novel means from escaping the trap.

It is a further object of the invention to provide a trap which can be readily emptied of its contents when removed from the water.

It is a further object of the invention to provide a trap which allows bait fish being lured into the trap to see and smell the luring bait, but not let the entrapped fish actually consume the bait.

These and other objects and advantages of the invention will be seen from the detailed description which follows The drawings constitute a part of this specification and include exemplary embodiments to the invention, which may be embodied in various forms.

BRIEF DESCRIPTION OF THE SEVERAL VIEWS OF THE DRAWINGS

For a further understanding of the nature, objects, and advantages of the present invention, reference should be had to the following detailed description, read in conjunction with the following drawings, wherein like reference numerals denote like elements and wherein.

DETAILED DESCRIPTION

Detailed descriptions of one or more preferred embodiments are provided herein. It is to be understood, however, that the present invention may be embodied in various forms. Therefore, specific details disclosed herein are not to be interpreted as limiting, but rather as a basis for the claims and as a representative basis for teaching one skilled in the art to employ the present invention in any appropriate system, structure or manner.

Figure 1:
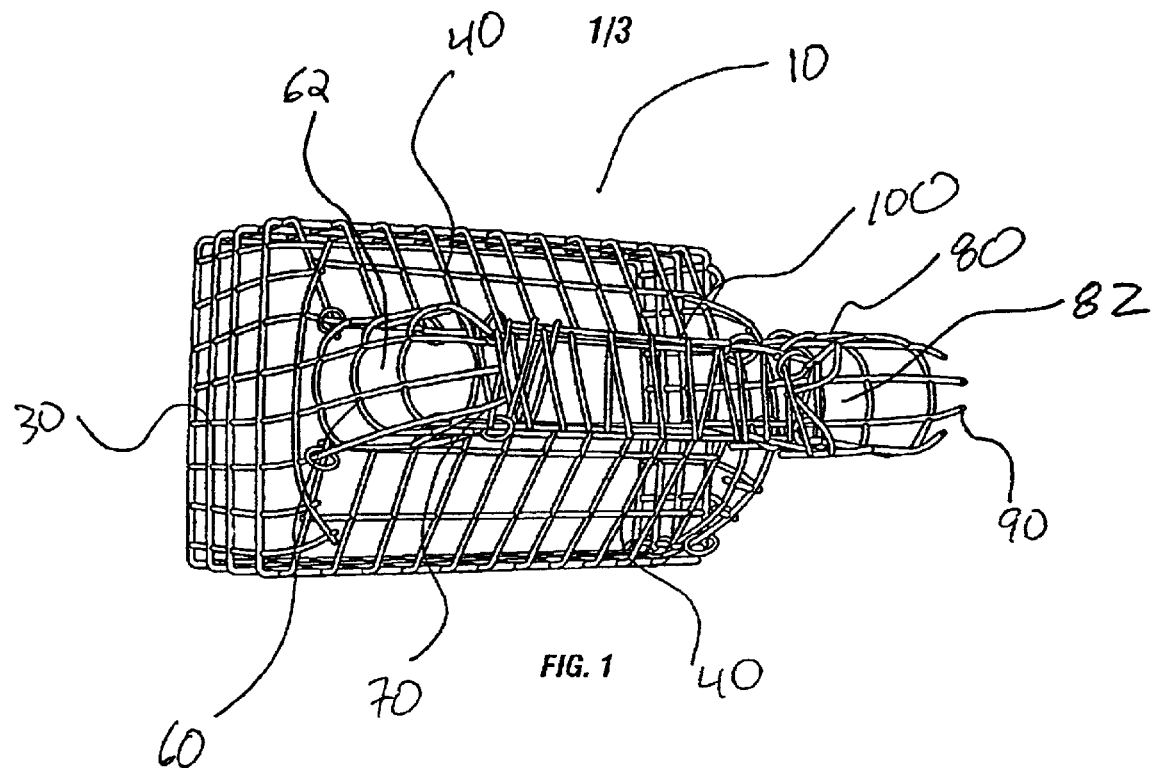
FIG. 1 is a perspective view of a preferred embodiment of an entrance gate.
Figure 2:
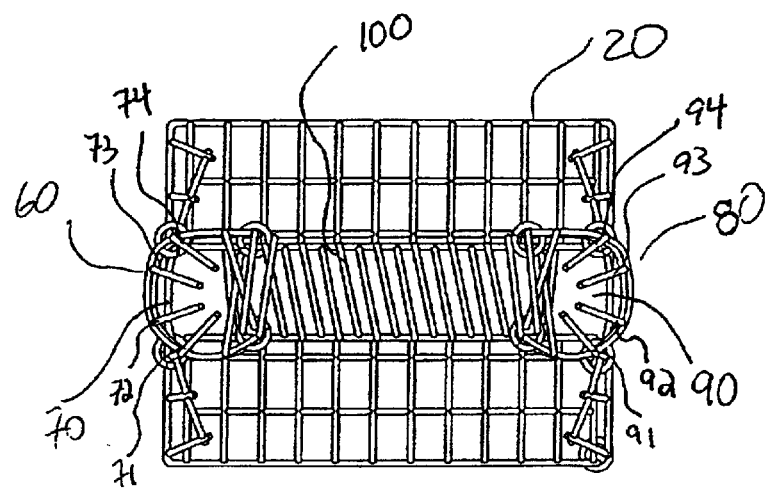
FIG. 2 is a front view of the entrance gate of FIG. 1.
Figure 3:
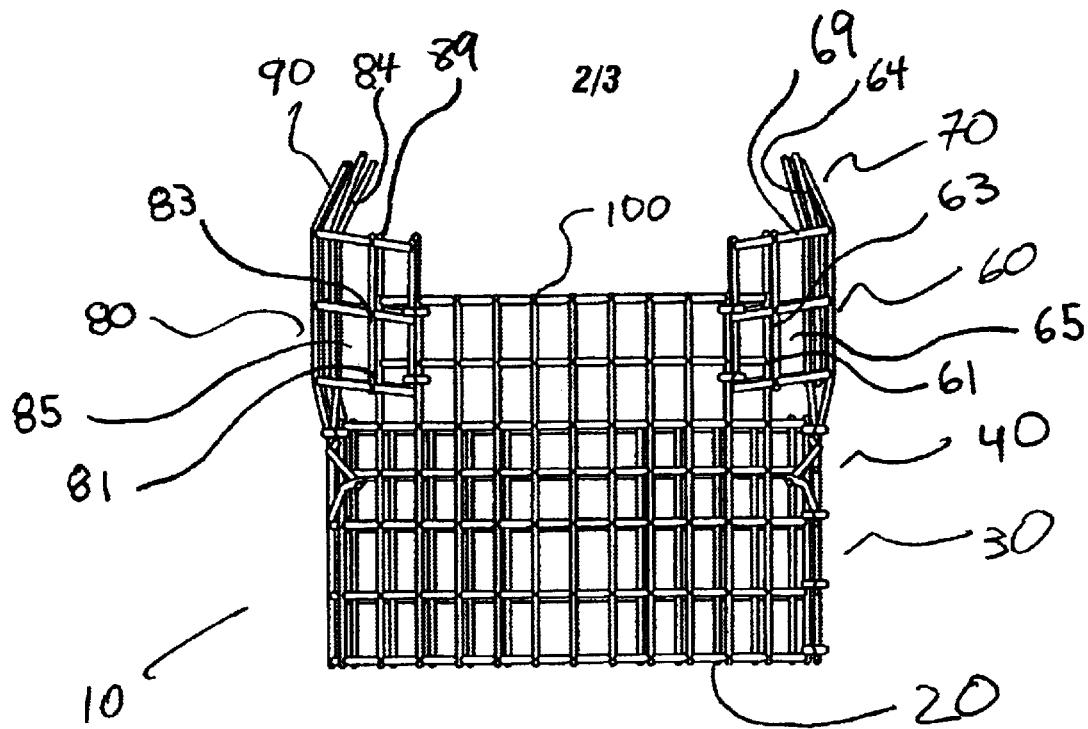
FIG. 3 is a top view of the entrance gate of FIG. 1.
Figure 4:
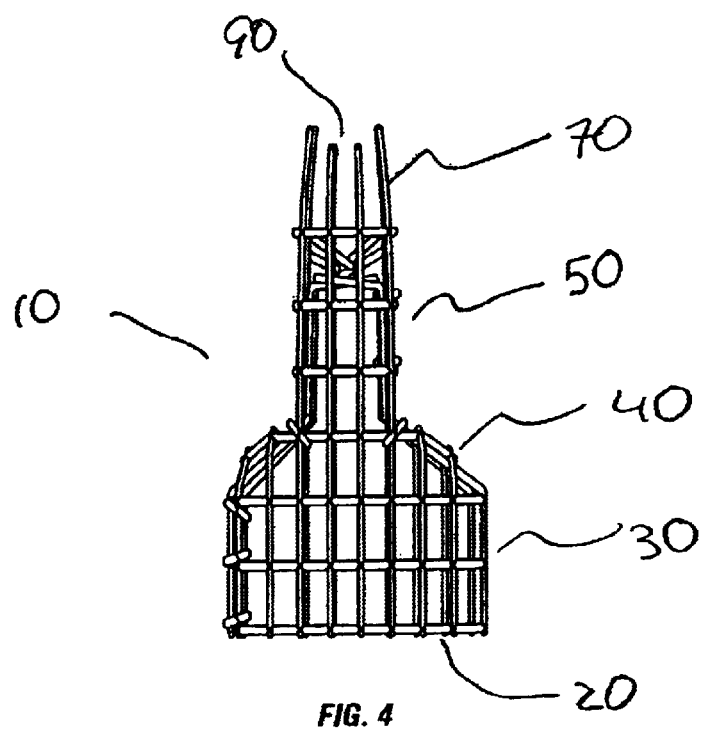
FIG. 4 is a side view of the entrance gate of FIG. 1.
Figure 5:
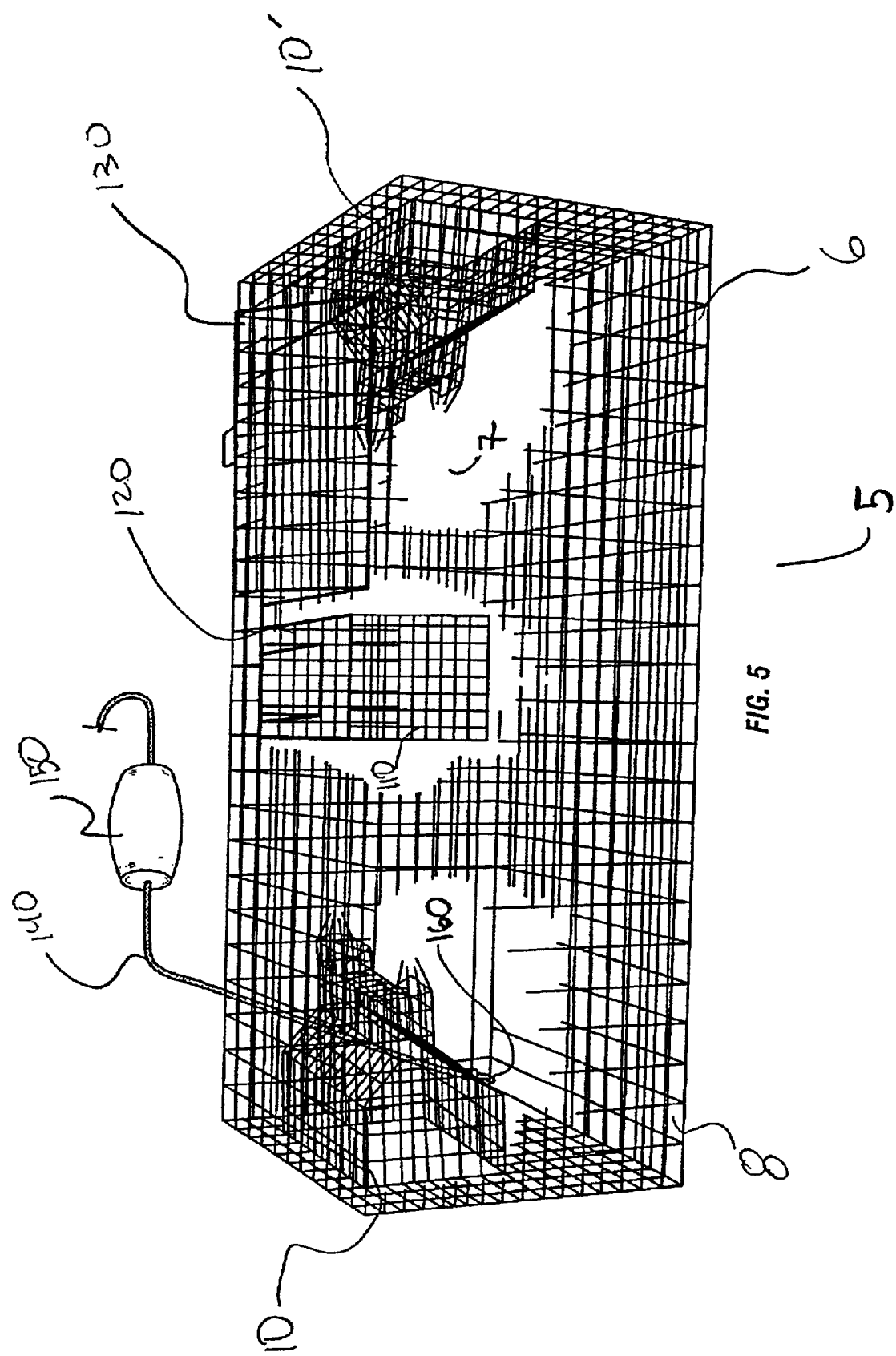
FIG. 5 is a perspective view of two entrance gates of FIG. 1 inside a bait fish trap.

FIGS. 1–4 shows various views of entrance gate 10. Gate 10 can include a main opening 20, first section 30, transition section 40, end section 50, first cylindrical section 60 with tip 70, and second cylindrical section 80 with tip 90.

Main opening 20 is adjacent first section 30. First section 30 is adjacent transition section 40. Transition section 40 is adjacent end section 50. Transition section 40 connects first section 30 and end section 50.

First section 30 can be of rectangular cross section and can be about 4 inches by about 6 inches. End section 50 can also be of rectangular cross section and can be about 1 inch by about 6 inches. The cross section of first section 30 is larger than the cross section of end section 50.

As shown in FIGS. 1–4, end section 50 can include first cylindrical section 60 and second cylindrical section 80. First cylindrical section 60 can include semi-circular cross section 62. First cylindrical section 60 includes outlet 69 and can include tip 70. Semi-circular cross section can have a diameter of about 1 inch to about 1.5 inches.

Tip 70 can be comprised of a plurality of rods 71, 72, 73, and 74. Rods 71–74 can be at angles 71A–74A from a line perpendicular to cross section 62. The angles 71A–74A do not have to be equal to each other. They can range from about 5 degrees to about 45 degrees, more preferably from about 15 degrees to about 35 degrees, and most preferably from about 25 degrees to about 35.

Rods 71–74 can be of various lengths and are not required to have equal lengths. The lengths can range from about one-quarter to about two times the diameter of semi-circular cross section 62; preferably from about one-half to about one and one-half the diameter; more preferably from about two-thirds to about one and one quarter the diameter; and most preferably from about two-thirds to about the diameter.

Second cylindrical section 80 can be located on the opposite side of end section 50 as first cylindrical section 60. As shown in FIGS. 1–4, the construction of second cylindrical section 80 can be similar to that of first cylindrical section 60.

With the trap 5 constructed as described, and when it is placed into the water, bait fish in the vicinity will be attracted by bait in the bait box 110 and will swim about one or more of the gates 10, 10' seeking entrance.

At any single point in time various bait fish to be lured can be swimming inside or around the gates 10, 10'. Additional bait fish endeavoring to reach bait box 110 will see these bait fish swimming inside the gates 10, 10' and/or interior 7 of cage 6. This will be a further incentive for luring the additional bait fish to enter gates 10, 10'.

After entering gate 10 and upon reaching one of its two longitudinal passages 60, 80, a particular bait fish will be forced to follow such longitudinal passage through outlet 69, 89 and into the interior 7 of the cage 6. Such a fish can enter the trap 5 past the rods 71–74, 91–94 without interference, even though the fish may touch the rods. Because the rods generally slope toward the direction of travel (FIGS. 1–4), the entering bait fish does not perceive an obstruction. However, after the bait fish enters interior 7 of cage 6, it will be prevented from leaving by rods 71–74, 91–94 which contact the fish when trying to leave cage interior 7 through outlets 69,89.

It should be understood that the size of the longitudinal bores 60,80 and cage openings 8 should be based on size of bait fish to be lured and entrapped. In a preferred embodiment the longitudinal bores 60,80 are about 1 inch to about 1.25 inches in diameter and cage openings 8 are about 0.5 inches by about 1 inch. Selectively sizing cage openings 8 allow underdeveloped and smaller bait fish to escape and minimizes the laborious task of separating such unacceptable trash fish when trap 5 is unloaded.

Trap 5 can be unloaded merely by raising it to the water surface using pull cord 140 and then opening door 130 over a storage container wherein the entrapped bait fish are discharged. If necessary, bait box 110 is refilled by opening door 120 before trap 5 is again placed in the water for the next catch.

Conventionally available plastic coated wire mesh can be used for trap 5 and gate 10,10' construction. Such plastic coating resists corrosion. The preferred size of the mesh is about 0.5 inches to about 1 inch. Alternatively, trap 5 and one or more gates 10,10' can be constructed in whole or part by injection molded plastic, metal, wood or other suitable materials.

Placing one or more gates 10,10' closer to the top of trap 5 improves its effectiveness when resting on the bottom of the water. When placed on the bottom trap 5 will sink somewhat in the soil/mud, but the lower portions of the one or more gates 10,10' will not sink below the bottom soil/mud. Accordingly, the bait fish to be lured will not see a partially obstructed gate entrance 20,20'.

One embodiment shown includes a bait trap 5 comprising: (a) a cage frame 6 having an interior portion 7, (b) a door 130 attached to the cage frame 6 and providing access to the interior portion 7, and (c) a first gate 10 attached to the cage 6 comprising, (i),an inlet section 20, (ii) an end section 50 connected to the inlet section 20 and allowing communication between the inlet section 20 and the end section 50, the end section 50 having first and second transverse sides 61, 81, (iii) a first longitudinal section 60 connected to the first transverse side 61 of the end section 50 and having a longitudinal bore 65, the longitudinal bore 65 having an opening 63 along at least part of its length allowing communication between the first longitudinal section 60 and the end section 50, the first longitudinal section 60 further including an outlet 69 allowing communication between the first longitudinal section 60 and the interior portion 7, the outlet 69 comprising a tip 90, and (iv) a second longitudinal section 80 connected to the second transverse side 81 of the end section 50 and having a longitudinal bore 85, the longitudinal bore 85 having an opening 83 along at least part of its length allowing communication between the second longitudinal section 80 and the end section 50, the second longitudinal section 80 further including an outlet 89 allowing communication between the second longitudinal section 80 and the interior portion 7, the outlet 89 comprising a tip 90.

The following is a list of reference numerals:

| LIST FOR REFERENCE NUMERALS | |
| --- | --- |
| (Reference No.) | (Description) |
| 5 | trap |
| 6 | cage |
| 7 | interior of cage |
| 8 | foraminous openings |
| 10 | gate |
| 20 | main opening |
| 30 | first section |
| 40 | transition section |
| 50 | end section |
| 60 | first cylindrical section |
| 62 | semicircular cross section |
| 64 | angle |

-continued

LIST FOR REFERENCE NUMERALS

| (Reference No.) | (Description) |
| --- | --- |
| 69 | outlet |
| 70 | tip |
| 71 | rod |
| 72 | rod |
| 73 | rod |
| 74 | rod |
| 80 | second cylindrical section |
| 82 | semicircular cross section |
| 84 | angle |
| 89 | outlet |
| 90 | tip |
| 91 | rod |
| 92 | rod |
| 93 | rod |
| 94 | rod |
| 100 | wall of end section |
| 110 | bait box |
| 120 | door for bait box |
| 130 | door for trap |
| 140 | pull cord |
| 150 | float |
| 160 | connection point for pull cord |

All measurements disclosed herein are at standard temperature; ad pressure, at sea level on Earth, unless indicated otherwise. All materials used or intended to be used in a human being are biocompatible, unless indicated otherwise.

It will be understood that each of the elements described above, or two or more se together may also find a useful application in other types of methods differing from the type of described above. Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention set forth in the appended claims. The foregoing embodiments are presented by way of example only; the scope of the present invention is to be limited only by the following claims.

What is claimed is:

1. A bait trap comprising:
 (a) a cage frame having an interior portion,
 (b) a door attached to the cage frame and providing access to the interior portion, and
 (c) a first gate attached to the cage comprising,
  (i) an inlet section,
  (ii) an end section connected to the inlet section and allowing communication between the inlet section and the end section, the end section having first and second transverse sides,
  (iii) a first longitudinal section connected to the first transverse side of the end section and having a longitudinal bore, the longitudinal bore having an opening along at least part of its length allowing communication between the first longitudinal section and the end section, the first longitudinal section further including an outlet allowing communication between the first longitudinal section and the interior portion, the outlet comprising a tip, and
  (iv) a second longitudinal section connected to the second transverse side of the end section and having a longitudinal bore, the longitudinal bore having an opening along at least part of its length allowing communication between the second longitudinal section and the end section, the second longitudinal section further including an outlet allowing communication between the second longitudinal section and the interior portion, the outlet comprising a tip
 (v) wherein the first longitudinal section is spaced apart from the second longitudinal section and a wall spans between the first longitudinal section and the second longitudinal section.

2. The bait trap of claim 1, further comprising a second gate constructed substantially identical to the first gate and attached to the cage at a position separate from the first gate.

3. The bait trap of claim 2, wherein the tips for the first and second longitudinal sections each comprise a plurality of rods.

4. The bait trap of claim 3, wherein the plurality of rods are at angles of between about 5 and about 45 degrees.

5. The bait trap of claim 3, wherein the plurality of rods are at angles of between about 15 and about 35 degrees.

6. The bait trap of claim 3, wherein the plurality of rods are at angles of between about 25 and about 35 degrees.

7. The bait trap of claim 3, wherein the longitudinal bore has a semicircular cross section and the lengths of the individual members of the plurality of rods range between about one-fourth to about two times the diameter of the cross section.

8. The bait trap of claim 3, wherein the longitudinal bore has a semicircular cross section and the lengths of individual members of the plurality of rods range between about one-half to about one and one-half limes the diameter of the cross section.

9. The bait trap of claim 3, wherein the longitudinal bore has a semicircular cross section and the lengths of the individual members of the plurality of rods range between about two-thirds to about equal the diameter of the cross section.

10. The bait trap of claim 2, wherein the cage frame includes at least one foraminous wall having openings about equal to one half inch by about one inch.

11. The bait trap of claim 2, further comprising a bait box for holding bait to attract bait fish.

12. The bait trap of claim 10, wherein the cage frame is 24 inches by 8 inches by 11 inches.

13. The bait trap of claim 10, wherein the cage frame further comprises a pull cord attached to the frame and a float attached to the pull cord.

14. The bait trap of claim 10, wherein the cage frame has six walls.

15. The bait trap of claim 2, wherein the cage and gates are at least partly constructed of wire mesh.

16. The bait trap of claim 15 wherein the wire mesh includes openings of a size to permit ready escape of fish of a size smaller than a desired size of fish to be trapped.

17. The bait trap of claim 16, wherein the wire mesh includes openings of about 0.5 inches by about 1 inch.

18. The bait trap or claim 2, wherein the cage includes top and bottom portions and the first and second gates are located closer to the top portion.

\* \* \* \* \*